United States Patent

Abuelsamid

[11] Patent Number: 5,615,934
[45] Date of Patent: Apr. 1, 1997

[54] METHOD AND SYSTEM FOR DETECTING AQUAPLANING OF A VEHICLE IN AN ANTI-LOCK BRAKE SYSTEM

[75] Inventor: Samir Abuelsamid, West Bloomfield, Mich.

[73] Assignee: Kelsey-Heyes Company, Romulus, Mich.

[21] Appl. No.: 308,388

[22] Filed: Nov. 29, 1994

[51] Int. Cl.⁶ ...................................................... B60T 8/00
[52] U.S. Cl. .................... 303/191; 303/122.06; 303/167; 303/176
[58] Field of Search .............................. 303/122.06, 156, 303/163, 164, 167, 168, 171, 173, 176, 191

[56] References Cited

U.S. PATENT DOCUMENTS

| | | |
|---|---|---|
| 3,883,184 | 5/1975 | Jonner et al. |
| 4,003,607 | 1/1977 | Haney et al. ........................ 303/122.06 |
| 4,059,312 | 11/1977 | Jonner . |
| 4,545,240 | 10/1985 | Leiber ........................................ 73/146 |
| 4,739,484 | 4/1988 | Fennel ................................ 303/159 X |
| 5,020,863 | 6/1991 | Yoshino . |
| 5,481,455 | 1/1996 | Iwata et al. .......................... 303/145 X |

*Primary Examiner*—Peter M. Poon
*Attorney, Agent, or Firm*—MacMillan, Sobanski & Todd

[57] ABSTRACT

Methods and systems for detecting aquaplaning of a vehicle both before and during braking in a vehicle anti-lock brake system (ABS) when the front wheels experience deep and substantial slip and tend not to recover. The system includes a wheel speed sensor for measuring the speed of each of the vehicle wheels, and a control unit for determining whether the anti-lock brake system should be activated without the need for applying a test braking pressure.

10 Claims, 9 Drawing Sheets

METHOD AND SYSTEM FOR DETECTING AQUAPLANING OF A VEHICLE IN AN ANTI-LOCK BRAKE SYSTEM

TECHNICAL FIELD

This invention relates generally to vehicle anti-lock brake systems (ABS). More particularly, this invention relates to methods and systems for detecting aquaplaning of a vehicle in an anti-lock brake system.

BACKGROUND ART

In an effort to protect vehicle operators and occupants, vehicle manufacturers and their suppliers are increasingly designing and manufacturing vehicles with additional and improved safety features. One such safety feature that has been incorporated into a number of vehicle types is anti-lock braking, which can take a variety of forms.

Vehicle anti-lock brake systems are designed to maximize the ability of a vehicle operator to bring a vehicle to a controlled stop on any type of road surface. The system accomplishes this goal by preventing the vehicle brakes from prematurely halting vehicle wheel rotation, or "locking" the vehicle wheels, regardless of the road surface and the pressure applied to the brake pedal by the vehicle operator.

Typical vehicle anti-lock brake systems include vehicle wheel speed sensors for providing inputs to an anti-lock brake system control unit. The control unit controls anti-lock brake system control valves interposed between the brake master cylinder and the individual wheel brakes of a hydraulic brake circuit. Such control valves include isolation valves and dump valves. The control valves, in turn, regulate hydraulic brake fluid pressure in the individual wheel brakes to implement anti-lock braking.

In operation, one or more of the vehicle wheel speed sensors not only measures the vehicle wheel speed, but also provides input to the control unit for determining the vehicle speed. The control unit monitors the vehicle and vehicle wheel speeds for an indication of an anti-lock braking event. First, based upon the vehicle speed, the control unit typically determines a slip threshold. Using the vehicle velocity as a reference, slip threshold may be expressed as the difference between a selected velocity and the vehicle velocity.

Next, the control unit compares the vehicle wheel velocity to the vehicle velocity to determine a departure depth. Again using the vehicle velocity as a reference, departure depth may be expressed as the difference between the vehicle velocity and the wheel velocity. During normal vehicle braking, the wheel velocity closely matches the vehicle velocity. Thus, during normal vehicle braking, the difference between the vehicle velocity and the wheel velocity is nominal.

However, during an anti-lock braking event, the wheel velocity decreases significantly below, or "departs" from, the vehicle reference velocity. This is called "departure". In such a situation, as for example during hard braking on an ice covered road, the frictional force between the vehicle brake pads and the vehicle wheel exceeds that between the vehicle wheel and the road surface. Uncontrolled, such a frictional force differential causes the vehicle wheel to cease rotating, or to "lock."

In turn, locking causes the vehicle wheels to slip or "skid", rather than roll, over the road surface. Such vehicle wheel skidding dramatically reduces traction and the ability of the vehicle operator to bring the vehicle to a controlled stop.

To prevent such vehicle wheel lock and the accompanying problems, the control unit of an anti-lock brake system activates the anti-lock brake system isolation valve to regulate hydraulic brake fluid pressure in the individual wheel brakes during an anti-lock braking event. More specifically, the control unit compares the departure depth to the slip threshold and actuates the isolation valve when the departure depth exceeds the slip threshold in order to isolate the individual vehicle wheel brakes in the hydraulic brake circuit from the master cylinder, thereby halting any increase in brake fluid pressure in the vehicle wheel brakes and preventing incipient vehicle wheel lock.

More particularly, when, during vehicle braking, the departure depth exceeds the slip threshold, the isolation valve isolates brake fluid in the individual wheel brake from the increasing brake fluid pressure in the master cylinder in order to hold brake fluid pressure in the wheel brake constant. If the isolated brake fluid pressure in the wheel brake is still high enough to cause incipient wheel lock, the anti-lock brake system then bleeds, or dumps, brake fluid from the wheel brake through the dump valve to reduce brake fluid pressure therein.

Thereafter, the anti-lock brake system typically holds brake fluid pressure in the wheel brake constant until such time as the departure depth no longer exceeds the slip threshold, indicating that the vehicle wheel is again traveling at or near the velocity of the vehicle. At that time, the anti-lock brake system then increases, or builds, brake fluid thereto. Reapplication of brake fluid to the wheel brake may be at a steep or gradual rate, or some combination thereof, depending upon the circumstances or the control desired.

To maintain smooth braking and optimum vehicle control, some reapplication of brake fluid to the wheel brakes must be undertaken where the isolation of the brake fluid in the wheel brakes from that in the master cylinder has been prolonged, for example on the order of one hundred milliseconds or greater. Such reapplication must be undertaken in order to raise brake fluid pressure in the wheel brake to a level approximating that in the master cylinder before the isolation valve may deisolate the wheel brake from the master cylinder.

One problem associated with anti-lock brake systems as described above is their tendency toward false, or premature, activation. Premature activation can occur in a number of circumstances, such as where a road surface is partially ice covered or bumpy and individual vehicle wheels experience different coefficients of friction during braking. Typical anti-lock brake systems activate when the departure depth of any one of the vehicle wheels exceeds the slip threshold, despite the fact that the wheel would not have experienced excessive slip.

Moreover, typical anti-lock brake systems decrease the slip threshold after activation in order to increase anti-lock brake system sensitivity during an anti-lock braking event. Under normal conditions, this action improves the ability of the vehicle operator to slow or stop the vehicle in a controlled fashion.

At high speeds, typically over 50 mph, a vehicle may lose contact with a wet road which has a thin layer or film of water thereon. As a result, a wheel loses its capacity to transmit friction to the road surface and thus loses peripheral velocity. This is called hydroplaning or aquaplaning. During braking at such high speeds, the front wheels of the vehicle may experience deep and sustained slip and tend not to recover.

It is generally desirable to recognize this aquaplaning condition of a vehicle not only before braking but also after braking occurs. In such cases, once aquaplaning has been detected, the front wheels should be de-isolated and allowed to lock until the aquaplaning conditions are no longer present.

The U.S. patent to Leiber, U.S. Pat. No. 4,545,240, discloses a hydroplaning detection system which applies a low test braking pressure and measures wheel slip to determine the adhesion factor of the tires with respect to the road surface. If a given wheel slip occurs at a test pressure below that which would be expected, the driver can be alerted to the possibility of adverse road conditions. The test braking pressure can be applied manually or automatically.

The U.S. patent to Jonner, U.S. Pat. No. 4,059,312, discloses an ABS brake system which monitors the control signals for an inlet and outlet valve of each front wheel. When a valve for a first front wheel remains actuated for too long (e.g. 150 msec), the first wheel inlet and outlet valves will receive the second front wheel inlet and outlet control signals. If the inlet or outlet valves of both front wheels are actuated for too long (e.g. 150 msec), a first period begins (1.5 sec) to determine if hydroplaning is occurring. During this first time period, each front wheel inlet and outlet valve will receive its corresponding ABS control signal (i.e. left front wheel valves receive left front control signals). If valves for both front wheels remain actuated for the entire first period, ABS control of the front wheels will be switched off and a second time period (20 sec.) begins. The ABS control of the front wheels will be permanently switched off if the valves remain actuated throughout the second time period. If during the second time period, the braking operation ceases (i.e., the brake light goes out), ABS control is returned to the front wheels.

The U.S. patent to Jonner et al., U.S. Pat. No. 3,883,184, discloses an ABS brake system which monitors the control signals for an inlet and outlet valve of each front wheel in order to maintain faulty pressure control for the shortest possible time. If one of the valves is actuated longer than a predetermined time (150 msec for an outlet valve, 600 msec for an inlet valve), ABS control is disabled, unless the sensor signals present justify an extension of response time. If hydroplaning conditions exist (i.e. slip occurs at both front wheels), ABS control is not disabled and a second extended time period (20 seconds) is entered to verify that a fault does not exist. If the second time period expires and the slip signals persist, a fault is assumed and ABS control of all wheels is disabled.

Four control schemes for the '184 patent are possible:

1). If an outlet valve is actuated for said time and the front wheels do not slip, a defect is assumed and the ABS control is immediately disabled for the front wheels. The valves return to their unactuated position and the brakes are only pressurized by the master cylinder.

2). If an outlet valve is actuated for said time and a front wheel does slip, but previously no deceleration signal or no slip signals were present from both wheels, it is not clear whether a defect can be assumed. In this case, ABS control is disabled and the brakes are pulsed (by a series of alternating pressure increases and reductions at the brake cylinders) for 20 seconds. If the slip signal remains at the end of this 20 second period, the ABS control is permanently disabled on the front wheels until the fault is corrected.

3). If an outlet valve is actuated for said time and both front wheels slip, ABS control is continued for 20 seconds. If the slip signals continue after 20 seconds, the ABS control is disabled.

4). If an outlet valve is actuated for said time and both front wheels slip or one front wheel slips and both front wheels decelerate, the pressure at both front wheels is reduced for 1 second and then pulsed for 20 seconds. If the slip remains at the end of the 20 seconds, the ABS control is disabled.

The U.S. patent to Yoshino, U.S. Pat. No. 5,020,863, discloses an ABS control system which monitors the brake pressure control signals for both front wheels for hydroplaning. A hydroplaning condition occurs when the control signals for reducing or alternatingly reducing and holding the brake pressure on both front wheels continuously exceed a predetermined duration. When hydroplaning is detected, the second control mode is entered wherein the rotational behavior for the front wheel with the highest wheel speed is used to derive the brake pressure control signals for both front wheels.

SUMMARY OF THE INVENTION

An object of the present invention is to provide a method and system for detecting aquaplaning without the need for applying a test braking pressure in a vehicle ABS.

Another object of the present invention is to provide a method and system for detecting aquaplaning when the front wheels experience deep and sustained slip and tend not to recover both during and after braking in a vehicle ABS.

In carrying out the above objects and other objects of the present invention, in a vehicle ABS having a predetermined deceleration level for actuating the ABS on first and second front wheels of the vehicle, a method is provided for detecting aquaplaning of the vehicle prior to braking of the vehicle. The method includes the steps of determining vehicle speed and comparing the vehicle speed with a predetermined vehicle speed at which aquaplaning may occur. The method also includes the steps of generating first and second speed signals representing the speeds of the first and second front wheels, respectively, generating third and fourth signals representing the speeds of first and second rear wheels of the vehicle, respectively, and processing the first, second, third and fourth signals to determine if each of the speeds of the front wheels is more than a predetermined amount below a reference speed based on the speeds of the rear wheels. The method further includes the steps of calculating acceleration data representing acceleration of each of the front wheels based on the speeds of the front wheels, processing the acceleration data to determine if the acceleration of either of the front wheels is greater than a predetermined acceleration and increasing the predetermined deceleration level if the following conditions are met: (1) the vehicle speed is greater than the predetermined vehicle speed; (2) each of the speeds of the front wheels is more than the predetermined amount below the reference speed; and (3) the acceleration of neither of the front wheels is greater than the predetermined acceleration. The method finally includes the step of generating an aquaplaning detect signal as long as conditions (2) and (3) are still met for a predetermined time period after the step of increasing.

Preferably, the method further includes the step of calculating rear wheel deceleration data representing deceleration of the rear wheels based on the speeds of the rear wheels and processing the rear wheel deceleration data to determine if the deceleration of the rear wheels is less than a first predetermined deceleration. The step of increasing also requires that (4) the deceleration of the rear wheels is less than the first predetermined deceleration.

Still, preferably, the method further includes the steps of calculating front wheel deceleration data representing deceleration of the front wheels based on the speeds of the front wheels and processing the front wheel deceleration data to determine if the deceleration of the front wheels falls within a range of deceleration values.

Also, preferably, the method further includes the steps of processing the front deceleration data to determine if the deceleration of the front wheels is less than a second predetermined deceleration and processing the first and second signals to determine if each of the speeds of the front wheels is less than a predetermined speed. The step of increasing also requires that one of the following conditions is also met: (5) the deceleration of the front wheels falls within the range of deceleration values; or (6) the deceleration of the front wheels is less than the second predetermined deceleration and each of the speeds of the front wheels is less than the predetermined speed.

Still further in carrying out the above objects and other objects of the present invention, in a vehicle ABS, a method is provided for detecting aquaplaning of the vehicle during braking of the vehicle. The method includes the steps of determining vehicle speed and comparing the vehicle speed with a predetermined vehicle speed at which aquaplaning may occur. The method also includes the steps of generating first and second speed signals representing the speeds of first and second front wheels of the vehicle, respectively, and processing the first and second signals with the vehicle speed signal to determine if the following conditions are met: (1) both front wheels have been in a departure for a predetermined time; and (2) both front wheels have at least a predetermined slip. The method also includes the steps of calculating acceleration and deceleration data representing acceleration and deceleration of each of the front wheels, respectively, based on the speeds of the front wheels and processing the acceleration and deceleration data to determine if the following conditions are also met: (3) the acceleration of both of the front wheels is less than a first predetermined acceleration; (4) the deceleration of both of the front wheels is less than a predetermined deceleration; and (5) the acceleration of both of the front wheels is less than a second predetermined acceleration at all times during the departure. Finally, the method also includes the step of generating an aquaplaning detect signal if conditions (1) through (5) are met.

Further in carrying out the above objects and other objects of the present invention, systems are provided for carrying out the above methods.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
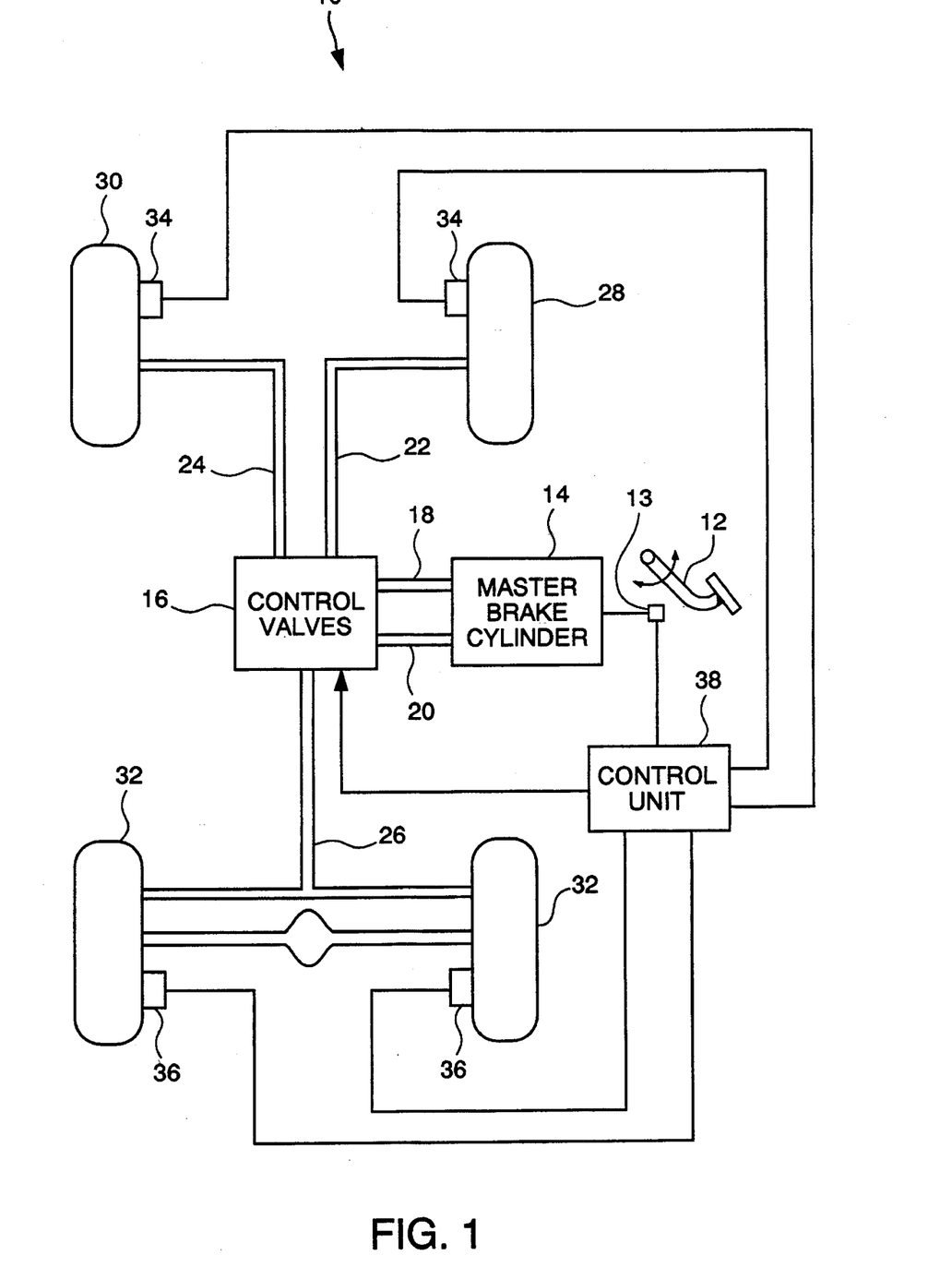
FIG. 1 is a schematic diagram of a vehicle and an interconnected system of the present invention in a vehicle ABS.

Referring now to FIG. 1, a schematic diagram of a motor vehicle and the system of the present invention is shown, denoted generally by reference numeral 10, in conjunction with an ordinary passenger vehicle anti-lock brake system (ABS). The anti-lock brake system includes a brake pedal 12, a brake switch 13, a brake master cylinder 14, control valves 16, brake fluid conduits 18, 20, 22, 24 and 26, as well as a right front wheel 28, a left front wheel 30, and a pair of rear wheels 32.

The system 10 of the present invention includes a pair of vehicle wheel speed sensors 34 for measuring the velocity of each of the front wheels 28 and 30, and a pair of vehicle wheel speed sensors 36 for measuring the velocity of each of the rear wheels 32. The system 10 further comprises an anti-lock brake system control unit 38. Each of the wheel sensors 34 and 36 are operatively connected to the control unit 38, which is itself operatively connected to the anti-lock brake system control valves 16. Such operative connections are preferably electrical, but may also be other types of connections, such as fiber optic.

As is well known in the art, each of the wheel speed sensors 34 and 36 may comprise a stationary variable reluctance sensor (not shown) positioned adjacent a toothed wheel (not shown) which rotates with its respective vehicle wheel 28, 30, 32. The variable reluctance sensors each generate a pulsed signal whose frequency varies directly with the speed of the respective vehicle wheels 28, 30, 32. Other well known wheel speed sensor configurations may also be employed.

The control unit 38 takes the form of a commercially available microprocessor. Once programmed, the microprocessor control unit 38 functions as a control means for setting a deceleration requirement for activating the ABS on the front wheels 28 and 30 without a brake switch signal from the brake switch 13 at a predetermined level such as 1.0 g. As described hereinbelow, the deceleration requirement is increased to a second predetermined level such as 4.0 g if various conditions are met. This prevents the ABS from going active due to the slip that is inherent in aquaplaning. If the brake switch signal is seen in this time, the ABS will still activate and isolate the appropriate wheels as it normally would.

Referring now to FIGS. 2a through 2e, there is illustrated a method for detecting aquaplaning of the vehicle prior to braking of the vehicle. The method is performed in an auxiliary program which is called from a main program as indicated by "A" in the drawings. The method includes the step of determining vehicle speed, such as from the history of wheel velocity information provided by the wheel speed sensors 34 and 36.

Figure 2A:
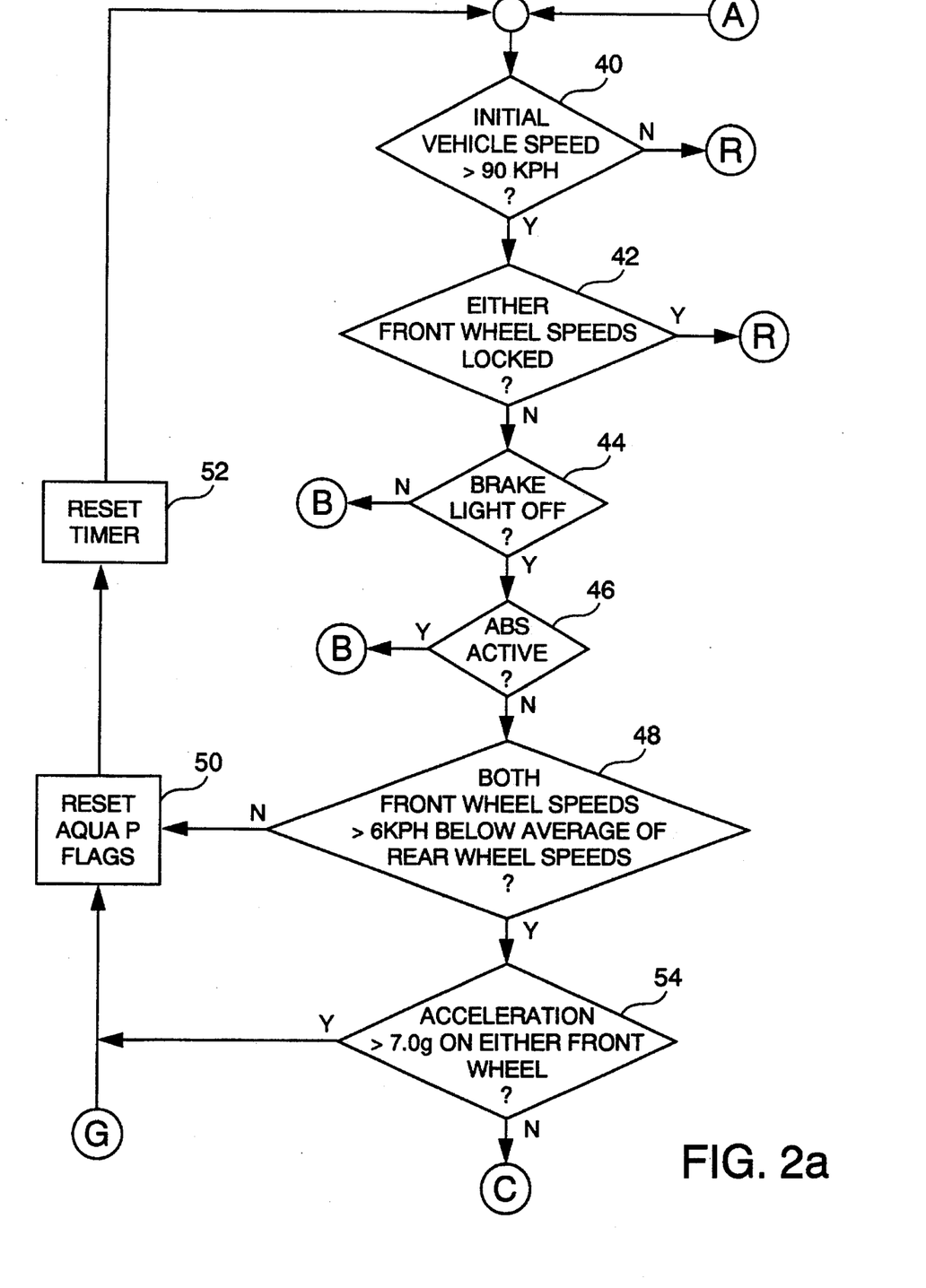
FIGS. 2a through 2c are block diagram flow charts of the method of the present invention for detection of aquaplaning prior to braking.

At block 40, the vehicle speed is compared with a predetermined vehicle speed at which aquaplaning may occur, such as 90 kph (kilometers per hour). If block 40 is false, then control is returned to the main program as indicated by "R".

In order for the method to continue, neither of the front wheel speeds may be locked, as indicated at block 42. Also, the brake lamp switch (not shown) must be off and the ABS must not be currently active, as indicated at blocks 44 and 46, respectively.

First and second speed signals representing the speeds of the first and second front wheels, 28 and 30, respectively, are generated by the front wheel sensors 34 as previously described. Also, third and fourth signals representing the speeds of first and second rear wheels 32 of the vehicle, respectively, are generated by the rear wheel sensors 36, also as previously described.

At block 48, the first, second, third and fourth signals are processed by the control unit 38 to determine if each of the speeds of the front wheels 28 and 30 is more than a predetermined amount, such as 6 kph, below a reference speed based on the speeds of the rear wheels 32.

In the preferred embodiment, the reference speed is the average of the rear wheel speeds. If not more than the predetermined amount, at block 50, aquaplane flags are reset and a timer is reset at block 52 prior to re-entering the program.

Figure 2B:
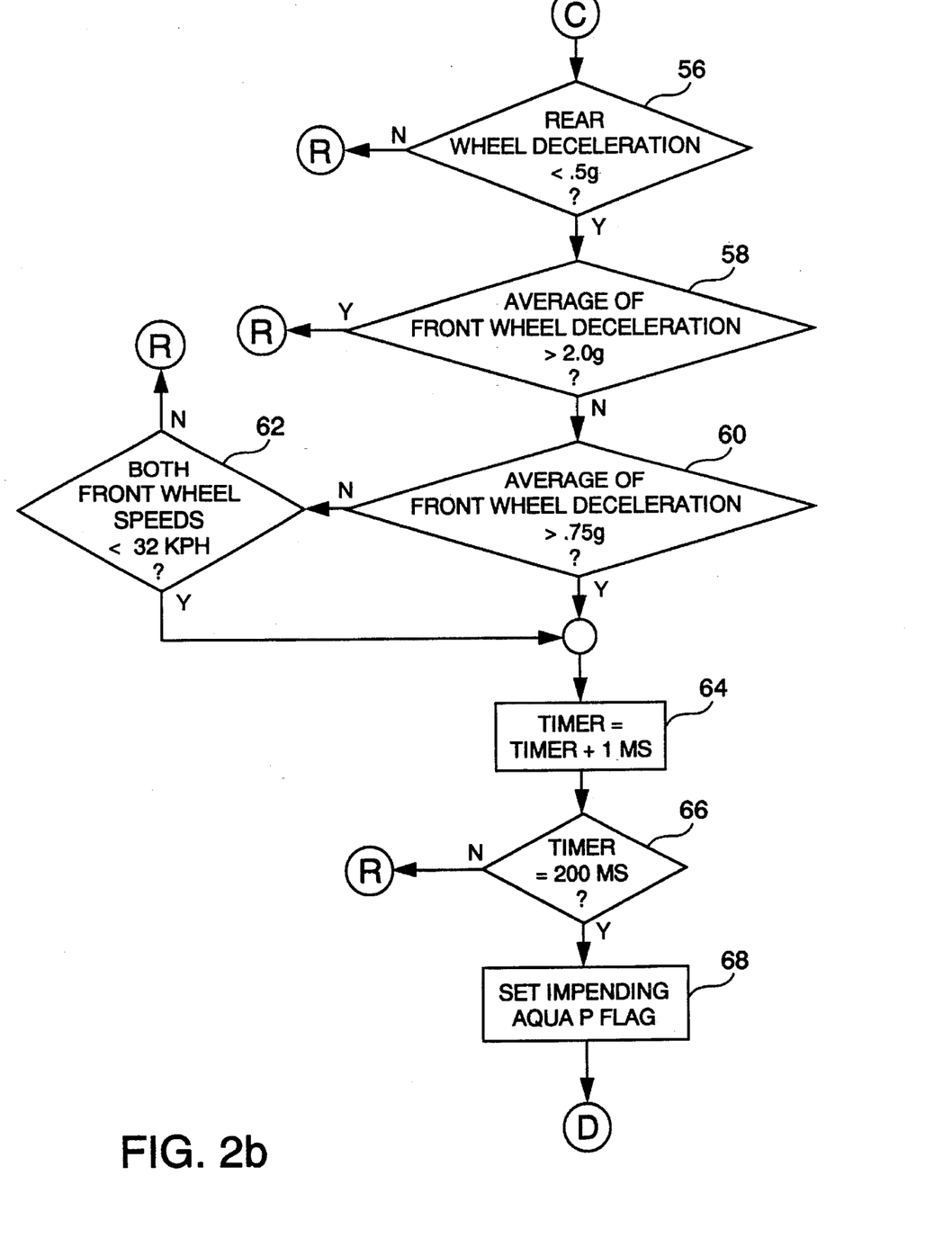

The control unit 38 then calculates acceleration data representing acceleration of each of the front wheels 28 and 30 based on the speeds of the front wheels 28 and 30. At block 54, the control unit 38 processes the acceleration data to determine if the acceleration of either of the front wheels 28 and 30 is greater than a predetermined acceleration, such as 7.0 g's. If greater, block 50 is entered. If less, block 56 is entered as illustrated in FIG. 2b.

The control unit 38 calculates rear wheel deceleration data representing deceleration of the rear wheels 32 based on the speeds of the rear wheels 32 and processes the rear wheel deceleration data to determine if the deceleration of the rear wheels 32 is less than a first predetermined deceleration, such as 0.5 g as indicated at block 56.

The control unit 38 then calculates front wheel deceleration data representing deceleration of the front wheels 28 and 30 based on the speeds of the front wheels 28 and 30 and processes the front wheel deceleration data to determine if the average deceleration of the front wheels 28 and 30 falls within a range of deceleration values such as between 0.75 g and 2.0 g as illustrated at blocks 58 and 60. If more than 2.0 g, program control returns to the main program.

The control unit 38 processes the front deceleration data to determine if the deceleration of the front wheels 28 and 30 is less than a second predetermined deceleration (i.e. 0.75 g) and processes the first and second signals at block 62 to determine if each of the speeds of the front wheels 28 and 30 is less than a predetermined speed. If blocks 60 or 62 are true, the timer is incremented at block 64. If the timer is a predetermined time such as 200 ms, then an impending aquaplane flag is set at block 68.

At block 70, the control unit 38, consequently, increases the predetermined deceleration level if the following conditions are met:

(1) the vehicle speed is greater than the predetermined vehicle speed; and (2) each of the speeds of the front wheels 28 and 30 is more than the predetermined amount below the reference speed; and (3) the acceleration of neither of the front wheels 28 and 30 is greater than the predetermined acceleration; and (4) the deceleration of the rear wheels 32 is less than the first predetermined deceleration; and (5) the deceleration of the front wheels 28 and 30 falls within the range of deceleration values; or (6) the deceleration of the front wheels is less than the second predetermined deceleration and each of the speeds of the front wheels 28 and 30 is less than the predetermined speed.

Figure 2C:
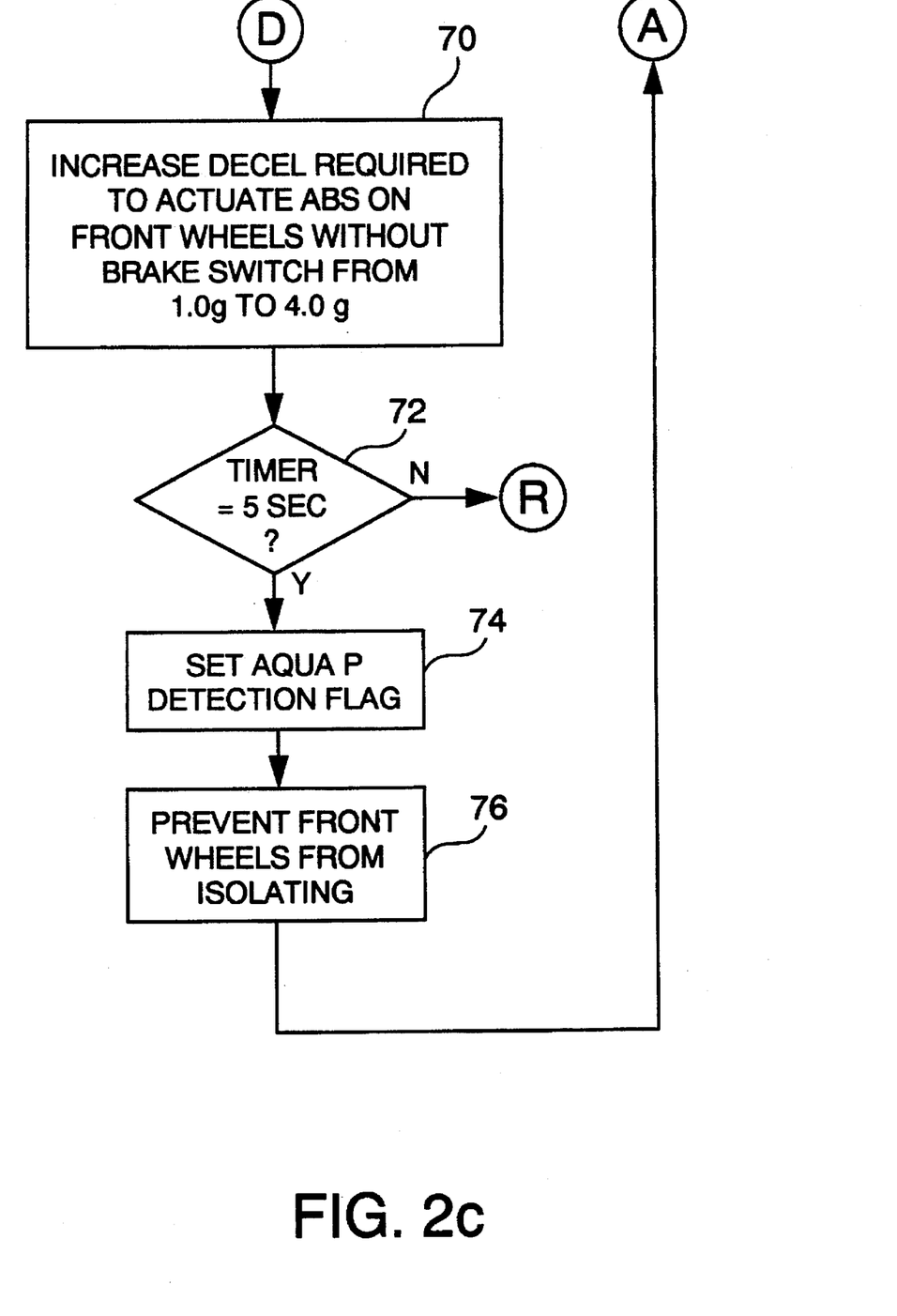

The control unit 38 generates an aquaplaning detect signal to prevent the front wheels 28 and 30 from isolating (i.e. blocks 74 and 76) as long as conditions (2) and (3) are still met for a predetermined time period after the step of increasing, as indicated at block 72.

In other words, in the preferred embodiment, when the aquaplaning timer reaches 5 seconds, the aquaplaning detection flag is set true and, as long as it stays true, the front wheels 28 and 30 will not be allowed to isolate. If at any time conditions (2) or (3) are not met, both aquaplaning detection flags and the timer are reset and the detection process starts again.

Figure 3:
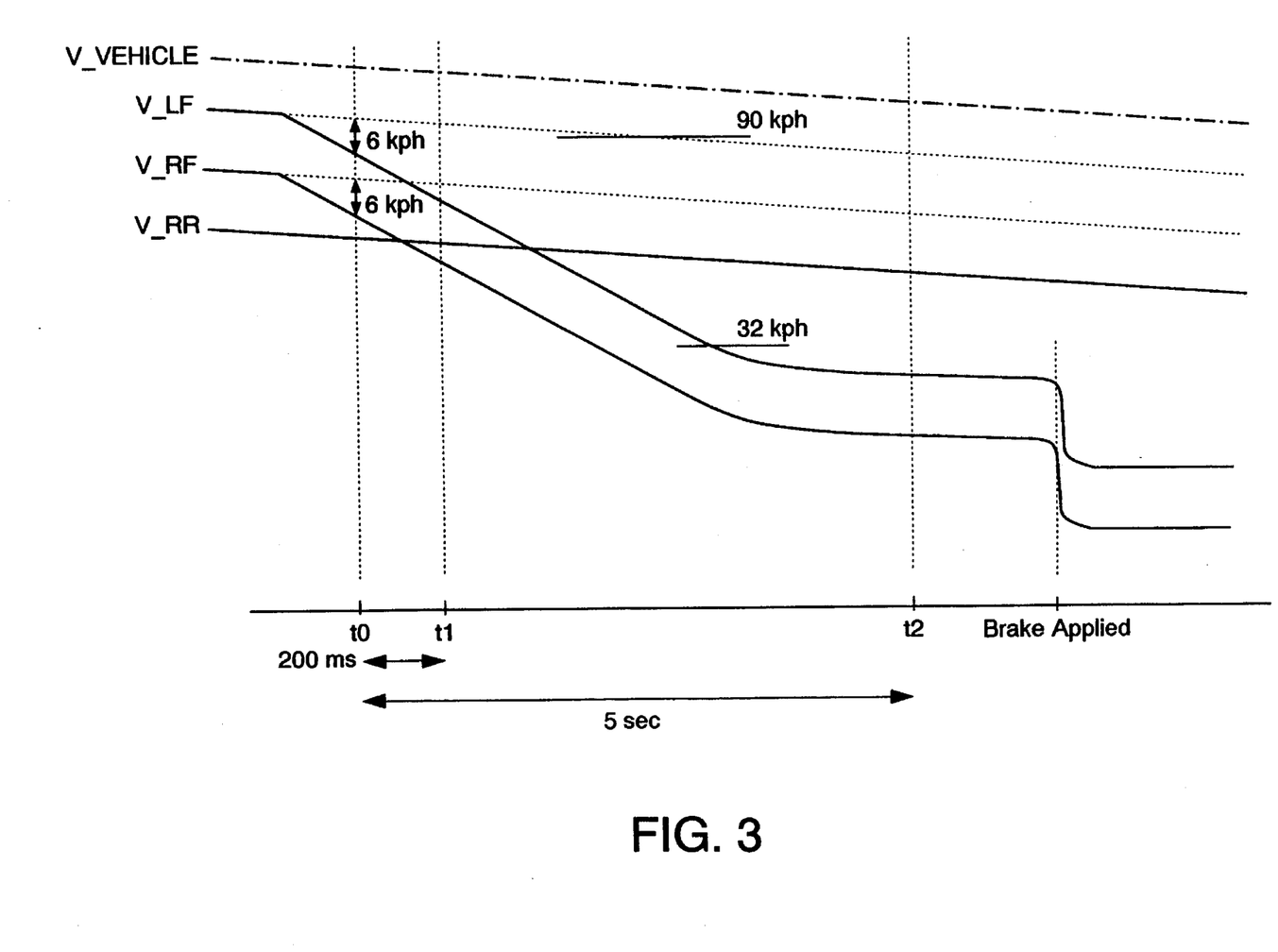
FIG. 3 is a graph of various velocities versus time illustrating the aquaplaning detection algorithm prior to braking.

FIG. 3 is a graph illustrating the above method algorithm wherein V_VEHICLE is vehicle velocity, V_LF is left front wheel velocity, V_RF is right front wheel velocity and V_RR is the average of the rear wheel speeds.

Figure 2D:
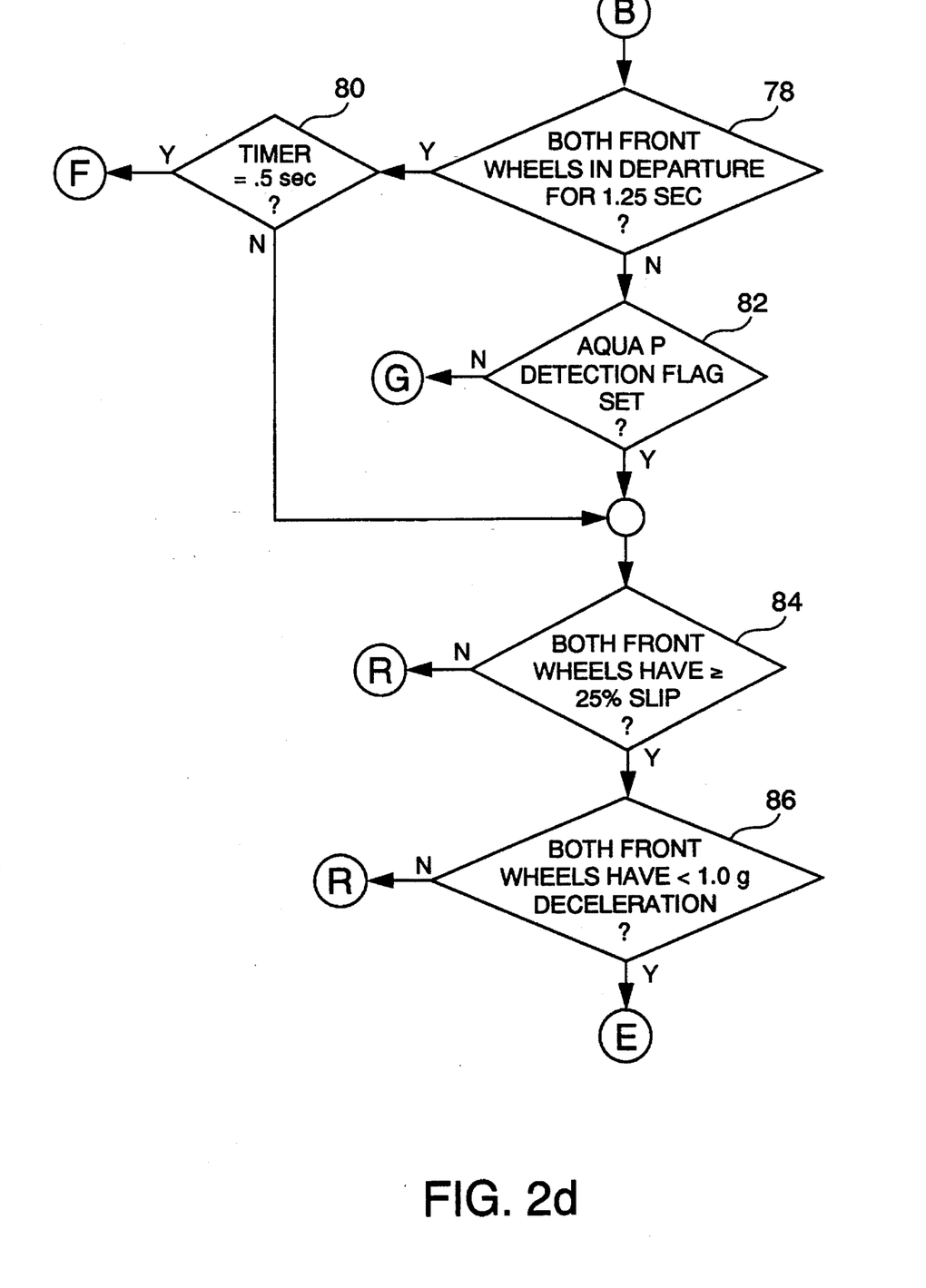
FIGS. 2d through 2f are block diagram flow charts of the method of the present invention for detection of aquaplaning following braking.

A method for detecting aquaplaning of the vehicle during braking of the vehicle is now described. As in the prior method, the method includes the steps of determining vehicle speed and comparing the vehicle speed with a predetermined vehicle speed at which aquaplaning may occur (i.e. 90 kph). Also, either the brake switch 13 must be on or the ABS must already be active. The aquaplaning detected flag must be false. If it is already true prior to braking, it will be kept true for the duration of the current stop and then rechecked to see if the conditions are still present.

Also, the method includes the step of generating first and second speed signals representing the speeds of first and second front wheels 28 and 30 of the vehicle, respectively.

Figure 2E:
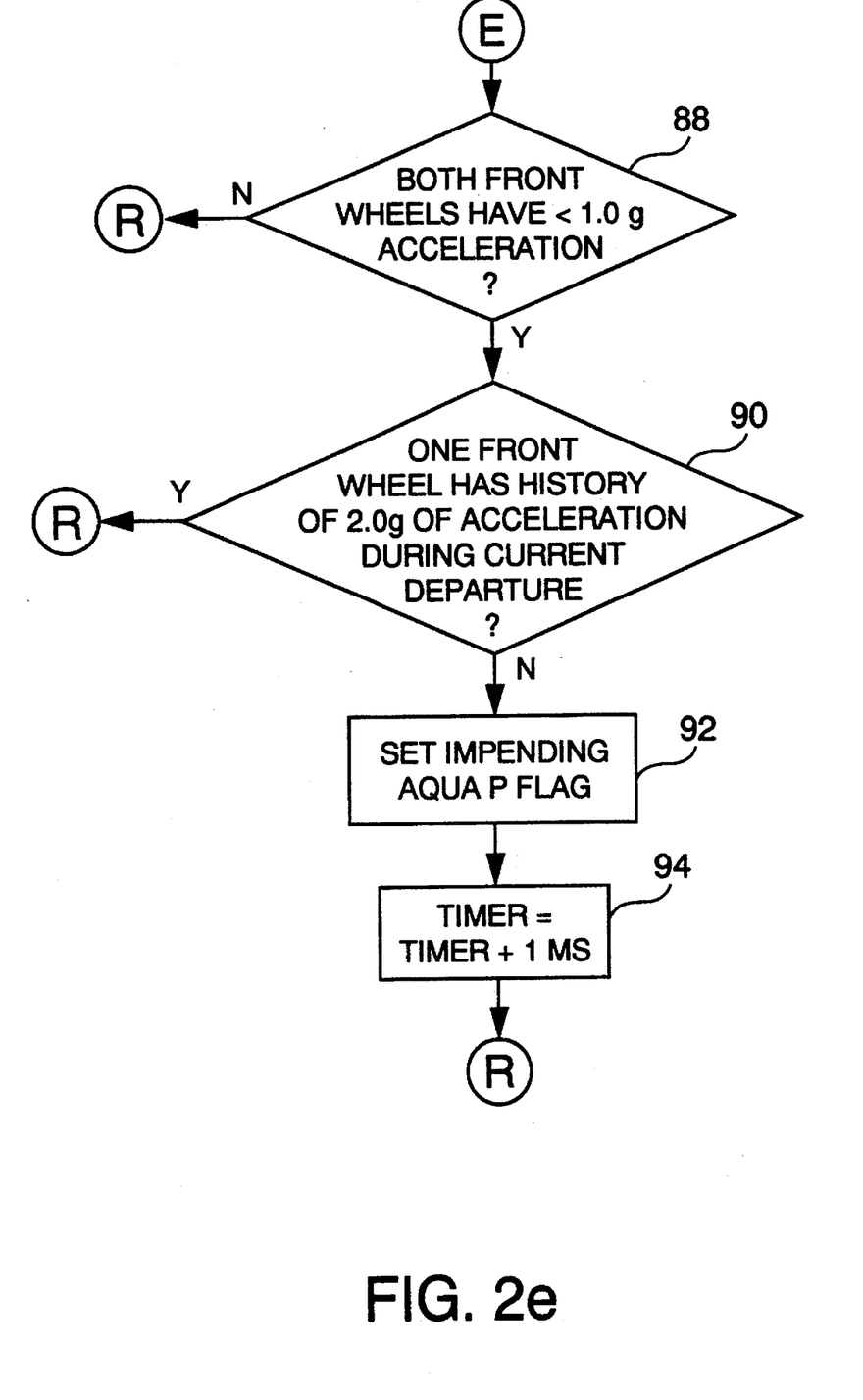
Figure 2F:
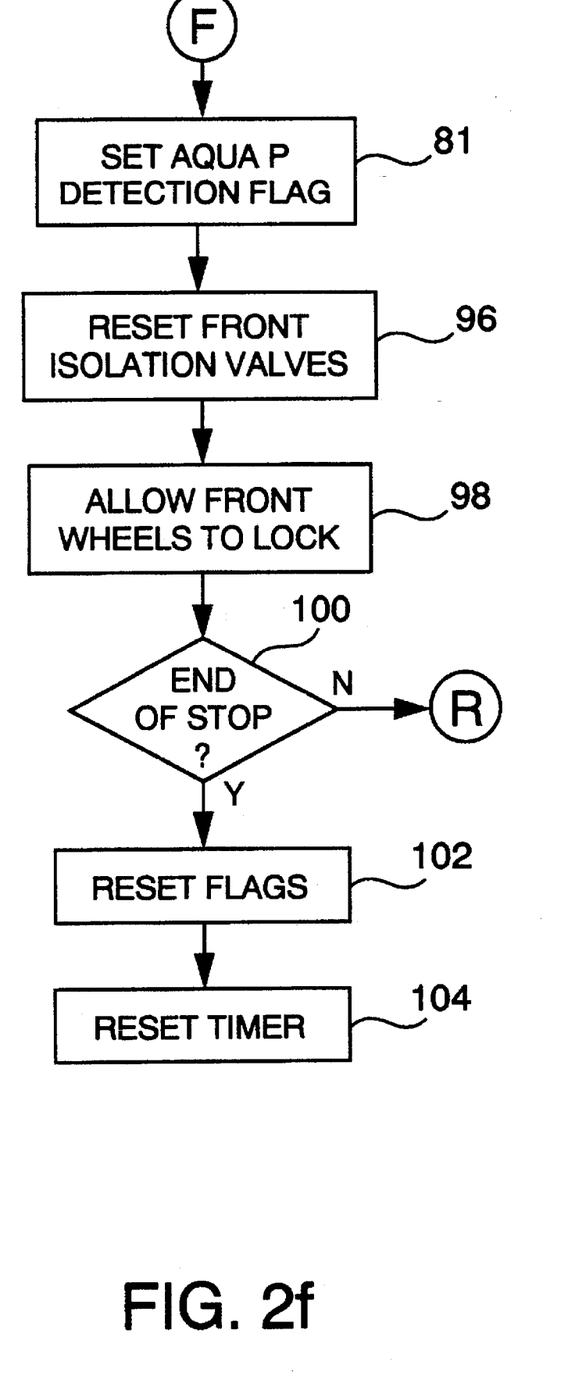

Referring now to FIGS. 2d through 2f, at block 78, the control unit 38 processes the first and second signals with the vehicle speed to determine if the following conditions are met:

(1) at block 78, both front wheels 28 and 30 have been in a departure for a predetermined time such as 1.25 seconds; and (2) at block 84, both front wheels 28 and 30 have at least a predetermined slip. If block 78 is true, the timer is checked at block 80 and if it is true then block 81 is entered in FIG. 2f. If block 78 is false, then at block 82 the aquaplane detection flag is checked. If set, block 84 is entered. If not set, block 50 of FIG. 2a is entered.

The control unit 38 then calculates acceleration and deceleration data representing acceleration and deceleration of each of the front wheels 28 and 30, respectively, based on the speeds of the front wheels 28 and 30. Then the control unit 38 processes the acceleration and deceleration data to determine if the following conditions are also met:

(3) at block 88, in FIG. 2e, the acceleration of both of the front wheels 28 and 30 is less than a first predetermined acceleration, such as 1.0 g;

(4) at block 86 in FIG. 2d, the deceleration of both of the front wheels 28 and 30 is less than a predetermined deceleration, such as 1.0 g; and (5) at block 90 in FIG. 2e, the acceleration of both of the front wheels is less than a second predetermined acceleration such as 2 g at all times during the departure At block 92, then the control unit sets an impending aquaplaning flag and at block 94 increments the timer.

When the timer reaches 0.5 seconds as indicated at block 80, the aquaplane detection flag is set as previously mentioned with respect to block 81. Consequently, the total detection time during braking including the initial slip duration requirement is 1.75 seconds.

After the detection flag has been set at block 81, the front isolation valves 16 are reset at block 96 and the front wheels are allowed to lock at block 98. The flags and timer are reset at the end of the stop as indicated at blocks 100, 102 and 104.

Figure 4:
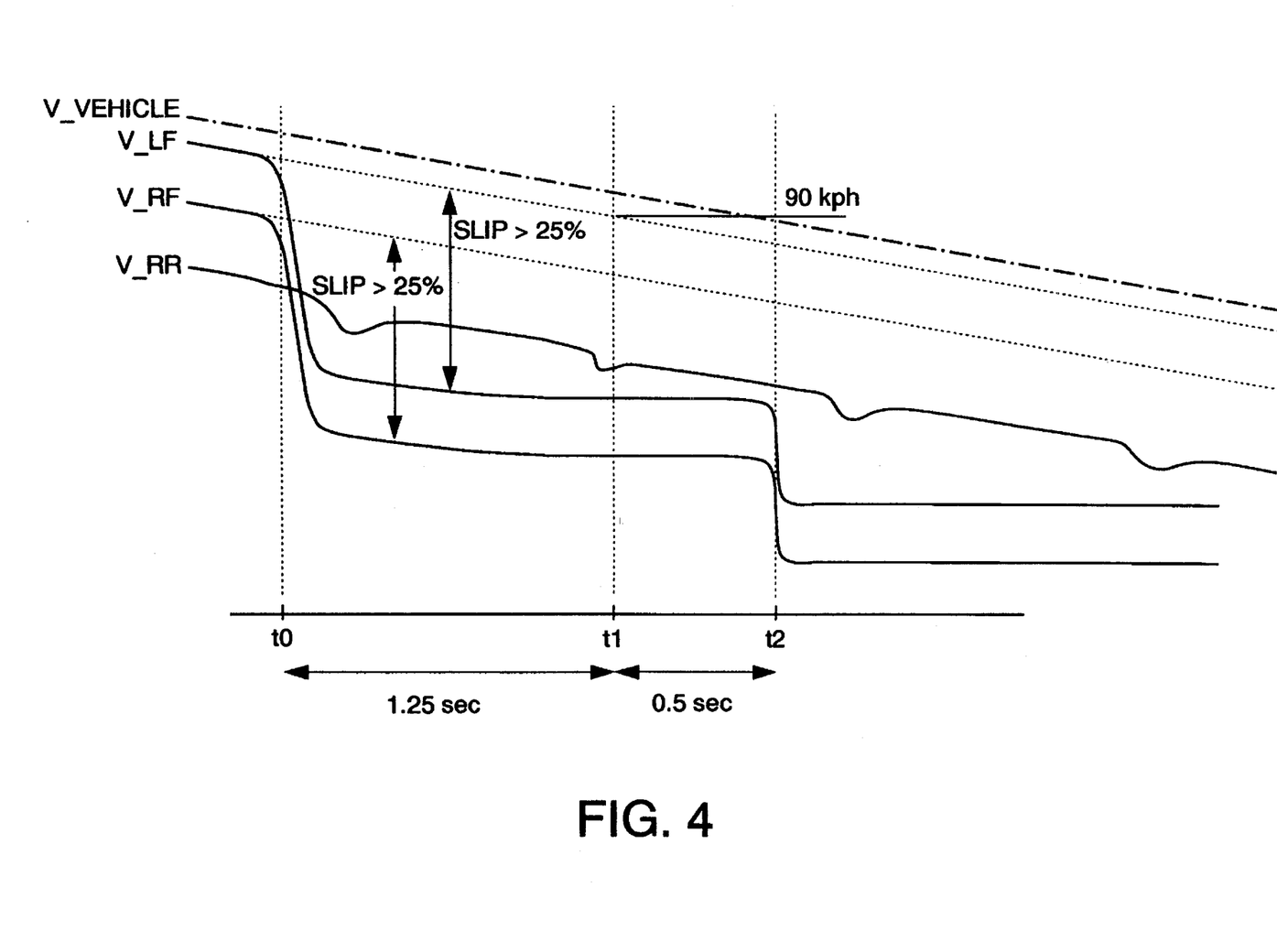
FIG. 4 is a graph similar to the graph of FIG. 3 illustrating the aquaplaning detection algorithm after brake application.

FIG. 4 is a graph illustrating the abovenoted algorithm after brake application wherein V-VEHICLE, V_LF, V_RF and V_RR represents the same velocities as in the algorithm for detecting aquaplaning prior to braking.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

What is claimed is:

1. In a vehicle ABS having a predetermined deceleration level for actuating the ABS on first and second front wheels of the vehicle, a system for detecting aquaplaning of the vehicle prior to braking of the vehicle, the system comprising:

first and second means for generating first and second speed signals representing the speeds of the first and second front wheels, respectively;

third and fourth means for generating third and fourth signals representing the speeds of first and second rear wheels of the vehicle, respectively;

a control unit coupled to the first, second, third and fourth means for:

determining vehicle speed and comparing the vehicle speed with a predetermined vehicle speed at which aquaplaning may occur;

processing the first, second, third and fourth signals to determine if each of the speeds of the front wheels is more than a predetermined amount below a reference speed based on the speeds of the rear wheels;

calculating acceleration data representing acceleration of each of the front wheels based on the speeds of the front wheels;

processing the acceleration data to determine if the acceleration of either of the front wheels is greater than a predetermined acceleration;

increasing the predetermined deceleration level if the following conditions are met:

(1) the vehicle speed is greater than the predetermined vehicle speed;

(2) each of the speeds of the front wheels is more than the predetermined amount below the reference speed; and (3) the acceleration of neither of the front wheels is greater than the predetermined acceleration; and generating an aquaplaning detect signal as long as conditions (2) and (3) are still met for a predetermined time period after the step of increasing.

2. The system of claim 1 wherein the control unit also calculates rear wheel deceleration data representing deceleration of the rear wheels based on the speeds of the rear wheels; and processes the rear wheel deceleration data to determine if the deceleration of the rear wheels is less than a first predetermined deceleration wherein the control unit increases the predetermined deceleration level only if the following condition is also met:

(4) the deceleration of the rear wheels is less than the first predetermined deceleration.

3. The system of claim 2 wherein the control unit also calculates front wheel deceleration data representing deceleration of the front wheels based on the speeds of the front wheels; and processes the front wheel deceleration data to determine if the deceleration of the front wheels falls within a range of deceleration values.

4. The system of claim 3 wherein the control unit also processes the front deceleration data to determine if the deceleration of the front wheels is less than a second predetermined deceleration and processes the first and second signals to determine if each of the speeds of the front wheels is less than a predetermined speed wherein the control unit increases the predetermined deceleration level only if one of the following conditions is also met:

(5) the deceleration of the front wheels falls within the range of deceleration values; or (6) the deceleration of the front wheels is less than the second predetermined deceleration and each of the speeds of the front wheels is less than the predetermined speed.

5. In a vehicle ABS, a system for detecting aquaplaning of the vehicle during braking of the vehicle, the system comprising:

first and second means for generating first and second signals representing the speeds of first and second front wheels of the vehicle, respectively;

a control unit coupled to the first and second means for:

determining vehicle speed and comparing the vehicle speed with a predetermined vehicle speed at which aquaplaning may occur;

processing the first and second signals with the vehicle speed to determine if the following conditions are met:

(1) both front wheels have been in a departure for a predetermined time; and (2) both front wheels have at least a predetermined slip;

calculating acceleration and deceleration data representing acceleration and deceleration of each of the front wheels, respectively, based on the speeds of the front wheels;

processing the acceleration and deceleration data to determine if the following conditions are also met:

(3) the acceleration of both of the front wheels is less than a first predetermined acceleration;

(4) the deceleration of both of the front wheels is less than a predetermined deceleration; and (5) the acceleration of both of the front wheels is less than a second predetermined acceleration at all times during the departure; and generating an aquaplaning detect signal if conditions (1) through (5) are met.

6. In a vehicle ABS having a predetermined deceleration level for actuating the ABS on first and second front wheels of the vehicle, a method for detecting aquaplaning of the vehicle prior to braking of the vehicle, the method comprising the steps of:

determining vehicle speed;

comparing the vehicle speed with a predetermined vehicle speed at which aquaplaning may occur;

generating first and second speed signals representing the speeds of the first and second front wheels, respectively;

generating third and fourth signals representing the speeds of first and second rear wheels of the vehicle, respectively;

processing the first, second, third and fourth signals to determine if each of the speeds of the front wheels are more than a predetermined amount below a reference speed based on the speeds of the rear wheels;

calculating acceleration data representing acceleration of each of the front wheels based on the speeds of the front wheels;

processing the acceleration data to determine if the acceleration of either of the front wheels is greater than a predetermined acceleration;

increasing the predetermined deceleration level if the following conditions are met:
(1) the vehicle speed is greater than the predetermined vehicle speed;
(2) each of the speeds of the front wheels is more than the predetermined amount below the reference speed; and
(3) the acceleration of neither of the front wheels is greater than the predetermined acceleration; and generating an aquaplaning detect signal as long as conditions (2) and (3) are still met for a predetermined time period after the step of increasing.

7. The method of claim 6 further comprising the steps of calculating rear wheel deceleration data representing deceleration of the rear wheels based on the speeds of the rear wheels; and processing the rear wheel deceleration data to determine if the deceleration of the rear wheels is less than a first predetermined deceleration wherein the step of increasing also requires that the following condition is met:
(4) the deceleration of the rear wheels is less than the first predetermined deceleration.

8. The method of claim 7 further comprising the steps of calculating front wheel deceleration data representing deceleration of the front wheels based on the speeds of the front wheels; and processing the front wheel deceleration data to determine if the deceleration of the front wheels falls within a range of deceleration values.

9. The method of claim 8 further comprising the step of processing the front deceleration data to determine if the deceleration of the front wheels is less than a second predetermined deceleration and processing the first and second signals to determine if each of the speeds of the front wheels is less than a predetermined speed wherein the step of increasing also requires that one of the following conditions is also met:
(5) the deceleration of the front wheels falls within the range of deceleration values; or
(6) the deceleration of the front wheels is less than the second predetermined deceleration and each of the speeds of the front wheels is less than the predetermined speed.

10. In a vehicle ABS, a method for detecting aquaplaning of the vehicle during braking of the vehicle, the method comprising the steps of:

determining vehicle speed;

comparing the vehicle speed with a predetermined vehicle speed at which aquaplaning may occur;

generating first and second speed signals representing the speeds of first and second front wheels of the vehicle, respectively;

processing the first and second signals with the vehicle speed to determine if the following conditions are met:
(1) both front wheels have been in a departure for a predetermined time; and
(2) both front wheels have at least a predetermined slip;

calculating acceleration and deceleration data representing acceleration and deceleration of each of the front wheels, respectively, based on the speeds of the front wheels;

processing the acceleration and deceleration data to determine if the following conditions are also met:
(3) the acceleration of both of the front wheels is less than a first predetermined acceleration;
(4) the deceleration of both of the front wheels is less than a predetermined deceleration; and
(5) the acceleration of both of the front wheels is less than a second predetermined acceleration at all times during the departure; and generating an aquaplaning detect signal if conditions (1) through (5) are met.

* * * * *